June 8, 1937.  E. F. NESS  2,083,084
PACKAGING MACHINE
Filed May 7, 1936  10 Sheets-Sheet 1

Inventor
Edward F. Ness
By Fred F. Crampton
Attorney

Inventor
Edward F. Ness
By
Attorney

June 8, 1937.  E. F. NESS  2,083,084
PACKAGING MACHINE
Filed May 7, 1936  10 Sheets-Sheet 10

Fig 20

KNIFE ARM CAM | FOLD PINS SWING CAM | TUCKING FINGER CAM | FOLD PINS RAISE CAM | COMB LOWER CAM | COMB RAISE CAM

Inventor
Edward F. Ness
By ~~~~ Attorney

Patented June 8, 1937

2,083,084

UNITED STATES PATENT OFFICE 2,083,084

PACKAGING MACHINE

Edward F. Ness, Toledo, Ohio, assignor to Unitpak Corporation, Rochester, N. Y., a corporation of New York Application May 7, 1936, Serial No. 78,399

27 Claims. (Cl. 93—2)

My invention has for its object to provide a machine for rapidly enpacking articles or subdivided portions of material and so disposing and enclosing them in a flexible wrapper that they may be readily removed singly therefrom by withdrawing enclosing portions of the wrapper.

My invention provides a packaging machine wherein flexible strips are folded or bent to form a plurality of receiving chambers into which articles and materials may be inserted, the contiguous portions of the paper strip being bent in reverse directions to locate the inside surfaces of the chambers thus formed from the strip on the same side of the strip and enable deposition of the articles or material on the same side of the strip so that when the package is finally formed, the articles may be conveyed by the strip to the exterior of the package by withdrawal of the strip. The invention thus provides a machine whereby portions of a flexible strip are chambershaped, and the articles are rapidly disposed in the chambers, and the articles thus assembled in the strip are delivered for further wrapping to maintain the articles within the enclosing portions of the flexible strips and enable ready manipulation of the strip for the removal of the articles or portions of material in succession from the wrapper.

The invention consists in other features which will appear from the following description and upon examination of the drawings. Structures containing the invention may partake of different forms and may be varied in their details and still embody the invention. To illustrate a practical application of the invention, I have selected a packaging machine embodying the invention as an example of the various structures and details of such structures that contain the invention and shall describe the selected machine hereinafter, it being understood that parts thereof may be used without using other parts and that variations may be made in the machine without departing from the spirit of the invention as claimed in the claims. The packaging machine selected as an example is shown in the accompanying drawings.

Figures 1, 2:
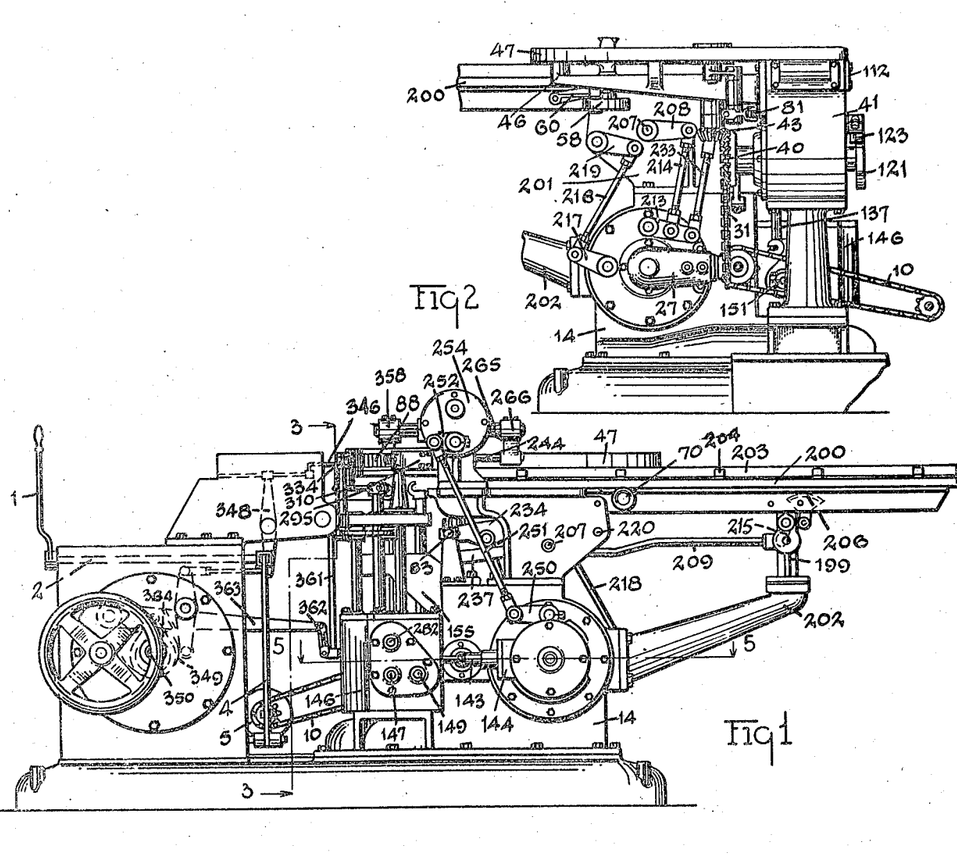
Fig. 1 is the side view of the packaging machine selected for purposes of illustration and as an example of the embodiment of my invention.
Fig. 2 is a view of a side of part of the machine opposite to that shown in Fig. 1.

In the form of the packaging machine shown in the drawings, the machine is controlled by a means of a clutch lever 1. It is connected to the clutch by means of a rod 2 and a link 4. (Fig. 1.) The clutch 5 connects a suitable power driven shaft with the main driving shaft 13 of the machine which actuates, through suitable connecting mechanisms, the moving parts of the machine. A sprocket chain 10 interconnects sprocket wheels secured to the driven shaft of the clutch 5 and the driving shaft 13 of the machine.

The description of the machine as here presented follows substantially the order in which the product is formed by the machine. A paper strip or other suitable flexible sheet material is bent sequentially in reverse directions to produce what is sometimes referred to as a zig-zag folding to form article receiving chambers or enclosures.

The articles are inserted between alternate bends of the strip to locate the articles on the same side of the strip but separated by two layers of the strip that join at the alternate bends. In the particular form of construction, the strip is disposed so that its edges are located one above the other and the articles are inserted between the alternate folds by substantially horizontal movements. The strip may be fed from a roll to a movable member or head, the strip being manipulated to supply the required amount to the head and avoid severance of the strip by the frictional drag of the roll that may be caused by variation in adjustment of the machine parts and variation in atmospheric humidity.

Figures 5, 6:
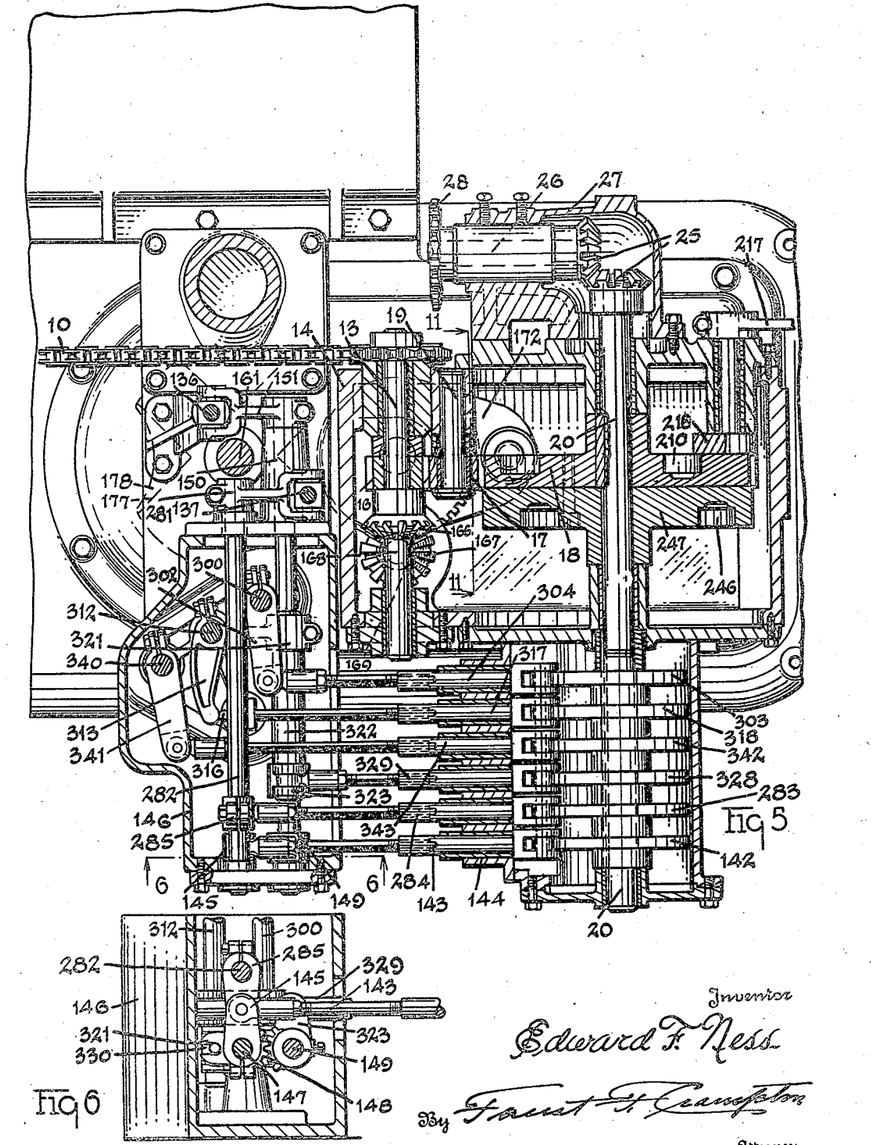
Fig. 5 is a view of a section taken on the plane of the line 5—5 indicated in Fig. 1.
Fig. 6 is a view of a section taken on the plane of the line 6—6 indicated in Fig. 5.
Figures 7, 8, 9:
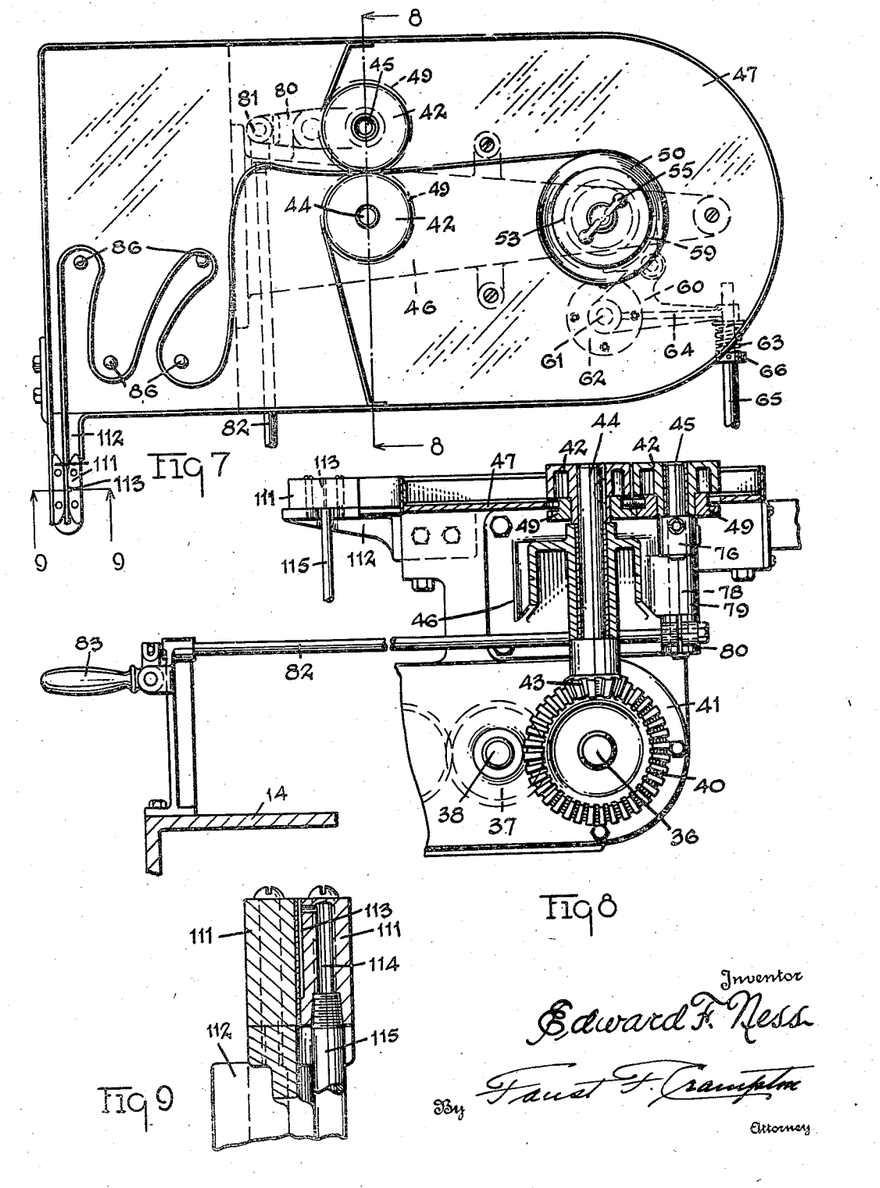
Fig. 7 is a top view of a paper feeding tray used in connection with the machine.
Fig. 8 is a view of a cross-section taken on the plane of the line 8—8 indicated in Fig. 7 and shows the drive of the paper feed.
Fig. 9 is an enlarged cross-section taken on the plane of the line 9—9 indicated in Fig. 7.
Figures 18, 19:
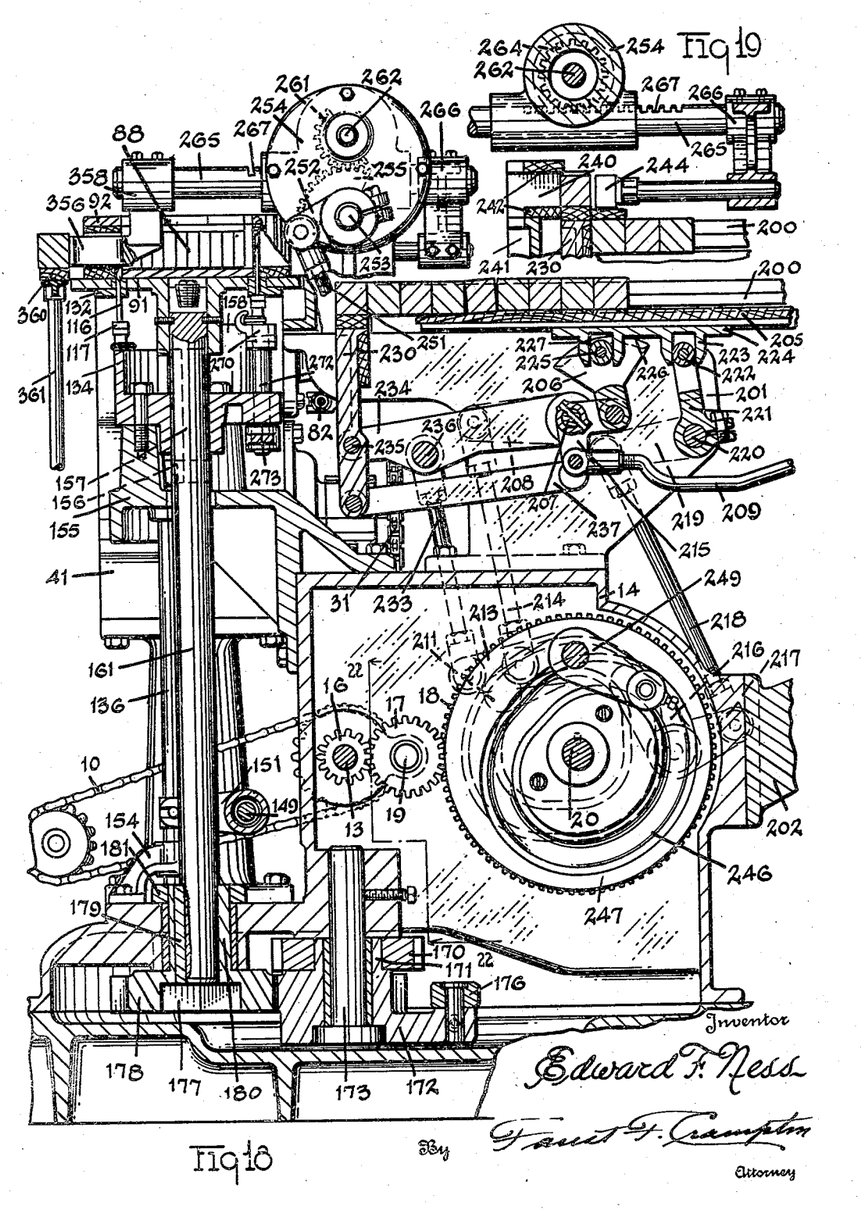
Fig. 18 is a cross-section taken on the plane of the line 18—18 indicated in Fig. 4.
Fig. 19 is a view of a part of the machine also illustrated in Fig. 18, the elements illustrated being shown in positions different from that in which they are shown in Fig. 18.

The shaft 13 operates a pair of friction rolls 42 to draw the paper from the roll 50. The shaft 13 operates through the gears 16, 17, and 18. (Figs. 2, 5, and 18.) The gear 16 is keyed to the shaft 13. The gear 17 is rotatably supported on the fixed shaft 19 which is secured in the frame 14. The gear 18 is secured to the shaft 20. The shaft 20, through a pair of gear wheels 25, drives the shaft 26 located in the housing 27. The shaft 26 has a sprocket wheel 28 and is connected by means of a sprocket chain 31 with the sprocket wheel 32 (Fig. 14) located on the shaft 33 and operates a gear wheel 35 located on the shaft 36 and an idler gear 37 mounted for free rotation on the shaft 38, and a beveled gear wheel 40 located on the shaft 36 that meshes with the beveled gear wheel 43 keyed to the shaft 44 to which one of the rollers 42 is connected. (Fig. 8.) The other roller 42 is rotatably supported on a shaft 45 and the rollers are connected by a pair of gear wheels 49 secured to the rollers 42. The shaft 44 is journaled in the bracket 46 which is secured to the wall of the gear box 41. Thus, the paper is drawn from the roll 50 at a rate required to supply the paper manipulating elements and maintain the desired slack to enable free operation of the elements on the paper strip and provide for the movement of the head.

Figures 10, 11, 12:
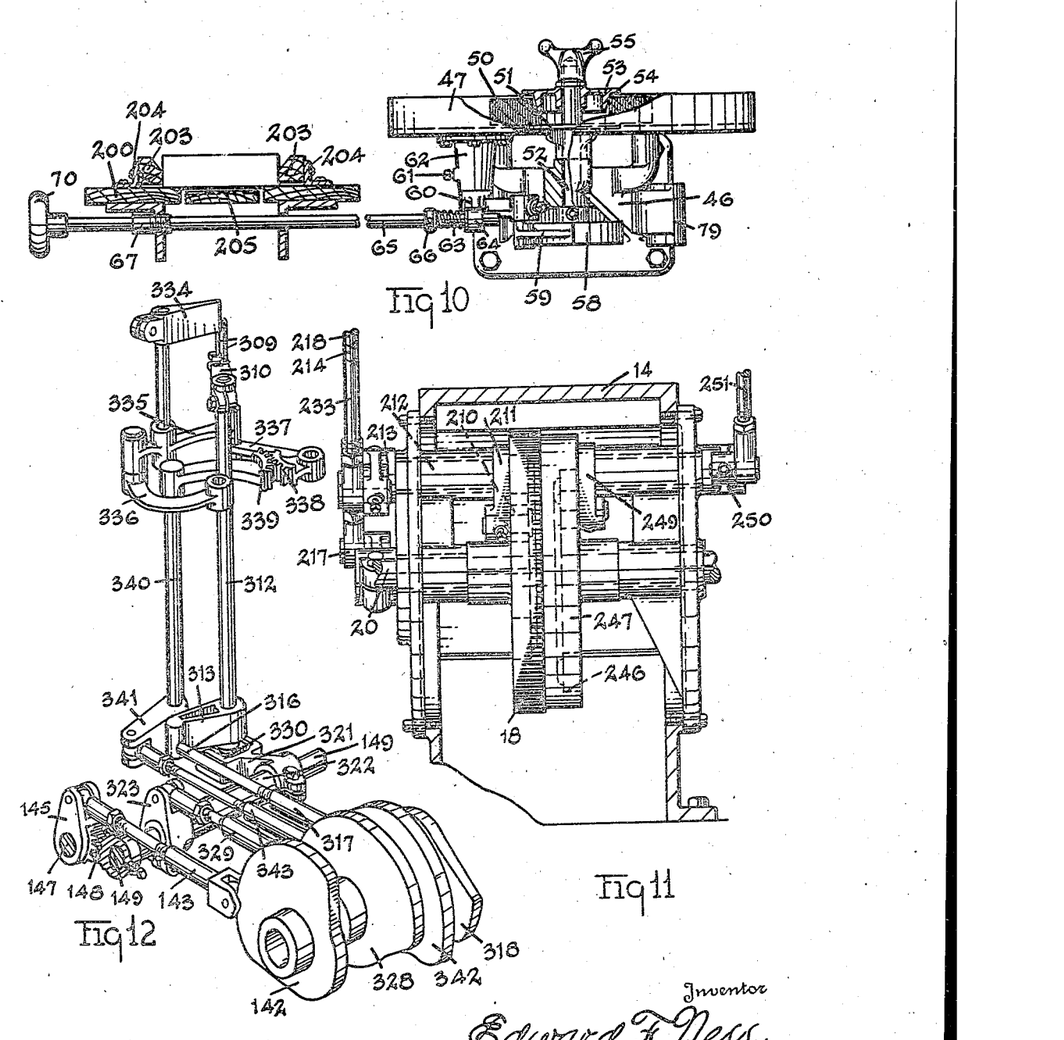
Fig. 10 is an end view of a strip supporting tray, parts being shown in section to illustrate certain features of the machine.
Fig. 11 is a view of a section taken on the plane of the line 11—11 indicated in Fig. 5.
Fig. 12 is a perspective view illustrating mechanism for timing the operations of parts of the machine.

The roll 50 of paper and the rollers 42 are located in a tray 47. The roll 50 of paper is supported on the shaft 52 to which is connected a disc 51 and a flanged collar 53. (Figs. 7 and 10.) The collar 53 is provided with a conical surface 54 which extends into and engages the central part of the roll at the inner end of the strip of paper. The conical surface 54 is pressed against the inner edge of the paper roll, and the central part of the paper roll is pressed against a disc 51 by the thumb nut 55 which is threaded onto an extension of the shaft 52.

To control the rate of discharge of the paper strip from the roll 50 according to the rate of its use in forming the article receiving chambers, an annular member 58 is disposed on the shaft 52 and may be frictionally engaged by a brake element 59. The brake element 59 is pivotally supported on a lever 60. (Fig. 10.) The lever is in turn positioned by means of a stud 51 which is adjustably located by means of a set-screw within a depending boss 62 secured to the under side of the tray 47. The lever 60 is biased to hold the brake element against the member 58 by means of the spring 63 located on the end of the rod 65. The spring 63 abuts the collar 66 pinned to the rod 65 and presses against the end 64 of the lever 60. A threaded sleeve portion 67 is connected to the rod 65 and is screwed into a part of the frame of the machine. The threaded sleeve operates to cause longitudinal movements of the rod 65 upon rotation of the rod. Thus, the rod may be adjustably advanced to vary the tension of the spring 63 between the end 64 of the lever 60 and the collar 66. A conveniently located handle 70 may be connected to the rod for adjusting the pressure of the spring 63 to vary the frictional resistance of the brake element to the rotation of the shaft 52 and consequently to vary the frictional resistance to the rotative movement of the paper roll 50 which counteracts the frictional engagement of the feed rolls 42 on the paper and thus controls the rate of supply of the paper.

In order to maintain a desired supply in the paper strip to provide for a rapid take-up necessary to form the receptacle receiving folds in the paper, a slack is produced intermediate the receptacle forming elements and the rollers 42. To prevent the formation of slack in the vicinity of the elements and yet enable ready take-up of the slack when required, the paper passes back and forth and around a plurality of pins 86 located on the tray. (Fig. 7.) The paper strip is drawn by the fingers and the rotation of the head from the tray 47 through a pair of guides 111 supported on a bracket 112. The guides 111 may be provided with a relatively narrow shallow slot 113 which connects through a passageway 114 to a water pipe 115 (Fig. 9) that may be connected to any suitable source of water supply to moisten one side of the paper. Moistening the paper is particularly of advantage when an oleaginous material is disposed and sub-divided as disposed in the chambers into which the paper strip is formed by the fingers.

Thus, by my invention, the slack is produced and controlled to permit a required irregular rate of feed or supply of the paper to the paper manipulating or fold forming elements and to prevent interference between the paper and the paper manipulating elements. If the excess is insufficient, the strip may be released from the feed rollers to enable the paper manipulating elements to draw that which they require without drawing against the friction of the rollers 42. This is obtained by manipulating one of the rollers 42 to release the strip from the frictional contact with the rollers. The roll may also be braked to reduce the amount of slack when an excess is produced.

The shaft 45 is supported on the end of a lever 76 (Figs. 7 and 8) to enable movement of the roller 42 connected to the shaft relative to the other roller to release the paper but without demeshing the gear wheels 49. The lever 76 is supported on the shaft 78 which is journaled in a boss 79 formed on the bracket 46. An arm 80 is connected to the shaft 78, and a rod 82 is connected, by means of the link 81, to the arm 80. The rod 82 is provided with a handle for convenient manipulation of the paper releasing roller 42 to control the slack.

In order to fold the paper to produce the desired receptacle receiving chambers, the paper is disposed in partitioned parts of the head by means of fingers sequentially operated and preferably having a shape required to produce the desired contour of the portions of the paper that form the article receiving chambers. The position of the bends will depend upon the dimensions such as the thickness and width of the articles, and the width of the strip will depend upon the remaining dimension of the article. A temporary strip engaging means engages the strip when in position to maintain the paper in the desired chamber form for the receipt of the articles, and prevent withdrawal of the paper from the movable member upon withdrawal of the fingers and movement of portions of the paper from one part of the head into contiguous parts of the head upon the insertion of the articles. The head may be rotated step-by-step to enable shaping of the strip in the sides or parts thereof, insertion of the articles into the shaped portions, and ejectment of the assembled paper and articles during the periodic dwells.

The head 88 is preferably provided with a plurality of sides into which fingers are adapted to insert the paper strip. The sides are each provided with the partitioning members that form chambers in which the strip may be shaped to produce the receptacles for the article. Thus, the head, in section at right angles to its axis of rotation, may conform to any regular geometric shape, such as triangular, square, or pentagonal according to the operations that are to be performed in connection with the paper or the articles during a complete rotation of the head. The head used in the machine has four sides.

Chamber forming partitioning sheet metal plates 89 are secured in spaced relation to each other by means of the retaining members 90 (Fig. 17) that are secured to the top and bottom plates 91 and 92 of the head 88. The retaining members 90 are located in the grooves 93 formed in the plates 91 and 92 and are secured therein by the screws 94. The plates 89 are secured to the retaining members 90 by means of the pins 95, and strips 99 are located between the retaining members 90. The strips 99 have interfitting grooves and ridges flared to cover and engage with the retaining members. The strips extend between the juxtaposed partitioning plates 89 and produce tops and bottoms of the chambers formed by the partitioning plates.

The strips 99 may be formed of material suitable for receiving the articles that are disposed in the paper formed chambers by sliding movements. Where an oleaginous material, such as butter or oleomargarine, is pressed into the chambers formed by the paper, the strips 99 are preferably formed of wood especially prepared to enable free movement of the material as it is forced into the paper formed chambers and subdivided and shaped.

The contiguous portions of the paper strips are formed into chamber shape by means of a plurality of fingers 104 which are supported on rods 105. (Figs. 13 to 16.) The rods 105 are supported in suitable bearings to enable longitudinal shifting movements of the rods. They are actuated by a plurality of levers 106 that are operated by a plurality of cams 108. Preferably, the levers are pivotally supported on the shaft 38. The levers 106 are provided with rollers 109 that engage the surfaces of the cams 108. The raised surfaces of the cams are so disposed and extended as to cause the fingers to operate sequentially in order that the article receiving chambers may be formed in the strip sequentially and to dwell within the formed chambers to prevent drawing portions of the paper from a previously formed chamber shaped portion and to draw the strip from the tray. Thus, the paper strip is drawn across the edges of the partitioning plates as the head is rotated, and the fingers operate sequentially to progressively take up the slack produced by the movement of the feed rolls. A slight tautness is produced in the paper as it leaves the tray to enable the production of the desired chamber form from the strip by the fingers and the partitioning plates.

Figure 13:
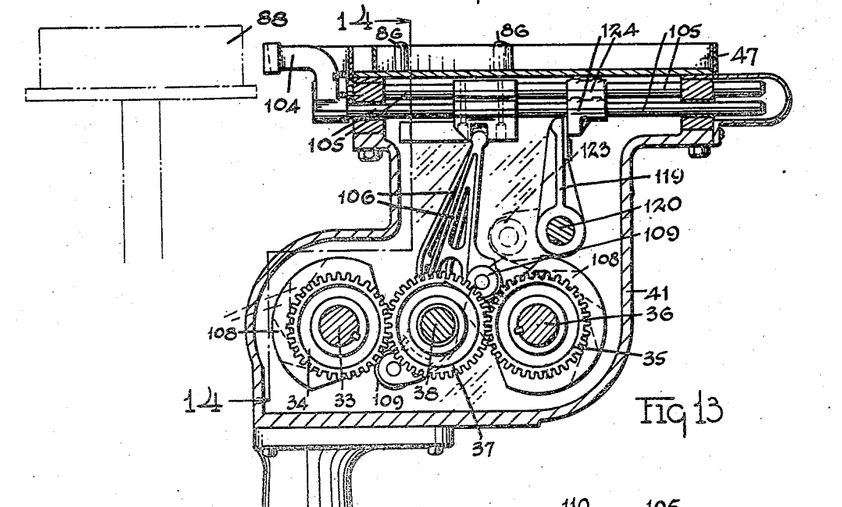
Fig. 13 illustrates a view of a section of the part of the machine that disposes the paper with reference to an article receiving head.
Figures 14, 15:
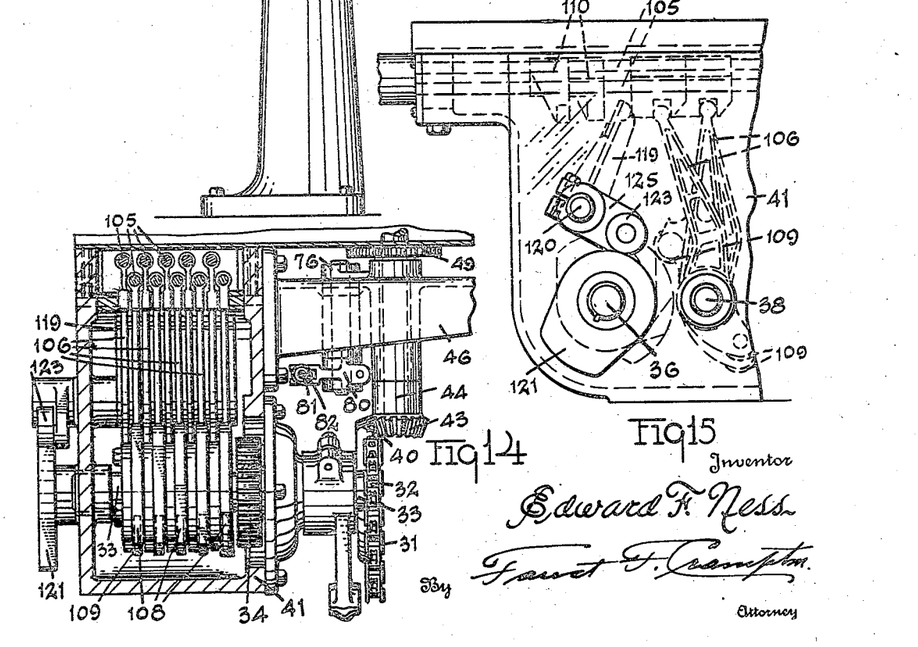
Fig. 14 is a view of a section taken on the planes of the broken line 14—14 indicated in Fig. 13.
Fig. 15 is a side view of a cam box.
Figure 20:
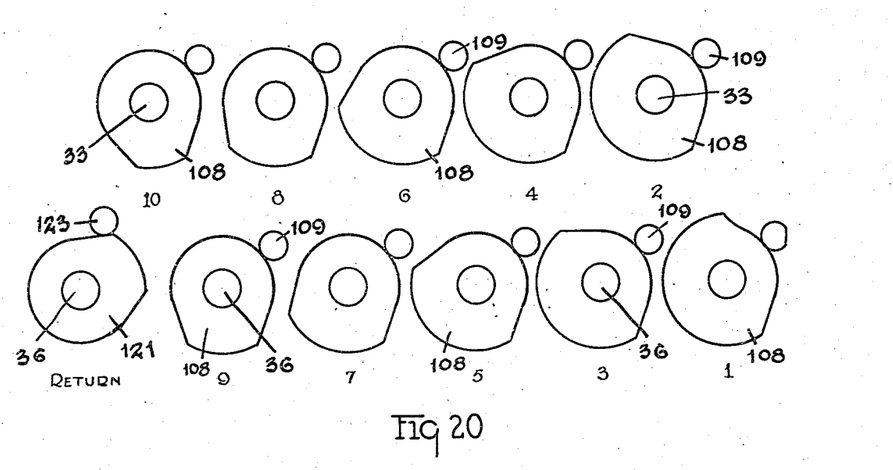
Fig. 20 illustrates diagrammatically the positions of the cams relative to members actuated thereby for manipulating the wrapping strip disposing elements.

The cams 108 are located on the shafts 33 and 36, the shafts being driven by the gear wheels 34 and 35. (Figs. 13 and 14.) The gear wheels 34 and 35 are interconnected by idler gear wheel 37 located on the shaft 38. The alternate cams that operate the consecutively arranged fingers are disposed on the shaft 33 while the intermediately operating fingers are operated by the cams located on the shaft 36. This is indicated diagrammatically in Fig. 20. The protruding surfaces of the cams progressively extend in length to cause the fingers 104 to move in rapid succession and produce the required dwell to hold the paper in position in the head 88, during the operation of the succeeding fingers to prevent drawing of the paper from previously formed portions of the paper. Consequently, the dwell produced by the cams progressively decreases.

The paper is initially manually placed across the edges of the partitioning plates that form one set of chambers in the head 88. The succeeding finger elements perform their operations to insert portions of the strip beginning near the end of the paper and in the order of their location from right to left as viewed in Figs. 4 and 16. Upon the completion of the operation of the fingers, the paper strip is engaged by a suitable engaging means that prevents withdrawal of the paper by the withdrawal movement of the fingers. The head is moved clockwise to move the previously chamber-formed portion of the strip into position to receive the articles, which draws the paper across the edges of the partitioning plates that cooperate with the fingers to form the succeeding or following set of article receiving chambers.

The head 88 is provided with four sets of chambers to enable formation of the strip, insertion of the articles, severing of the paper strip between the sets, and discharge of the articles during each dwell of the head in its step-by-step movement. A strip retaining member is associated with each set of chambers to prevent withdrawal of the paper by withdrawal of the fingers and movement of the head. The four retaining members move with the head in its step-by-step movements.

In advance of withdrawal of the fingers, the paper in the chambers is engaged by a plurality of pins 116 connected in the form of a comb 117. The pins are raised into the chambers so as to engage the portions of paper in the chambers. The combs 117 are supported for vertical movement in the plates 132 (Fig. 18) which are secured to the bottom plate 91 of the head 88.

A cam 142, (Fig. 5) located on the shaft 20, operates a slide 143 supported in the bearing plate 144. The slide 143 is connected to a lever 145 and operates to oscillate the lever. The lever 145 is pivotally supported on the pin 147 journaled in the shell 146. The movement of the lever 145 is transmitted through segmental gears 148 to a shaft 149. (Fig. 6.) The shaft 149 is provided with an arm 151 (Fig. 5). The arm 151 is pivotally connected to the rod 136. Thus, upon movement of the cam 142, the rod 136 will move in an upward direction relative to the comb 117. Lateral movement of the rod 136 (Fig. 3) is prevented by a bearing member 154 in which the lower end of the rod moves and a bracket 155 through which the rod extends. The rod 136 is provided with an arm 156 that engages a short rod 157. The rod 157 is supported within an enlarged portion of the track 134 upon which the comb is moved and when the rod is raised, it raises the combs 117 as they are placed in engaging relation with the rod 157. Upon movement of the head 88, the combs 117 ride on an elevated portion 158 of the track 134 (Fig. 18) to the next point or station of movement of the head where they are lowered to withdraw the pins from their engaging relation with the paper.

The finger elements are withdrawn by means of an arm 119 keyed to the shaft 120 (Figs. 13, 14, and 15). The shaft 120 is journaled in the walls of the gear box 41 and actuated by the cam 121 located exterior to the box on the shaft 36. The cam 121 operates the arm 119. An arm 125 is also secured to the shaft 120 and is provided with a suitable roller 123 that operates the arm 119 to return the fingers 104 and the rods 105.

Figure 3:
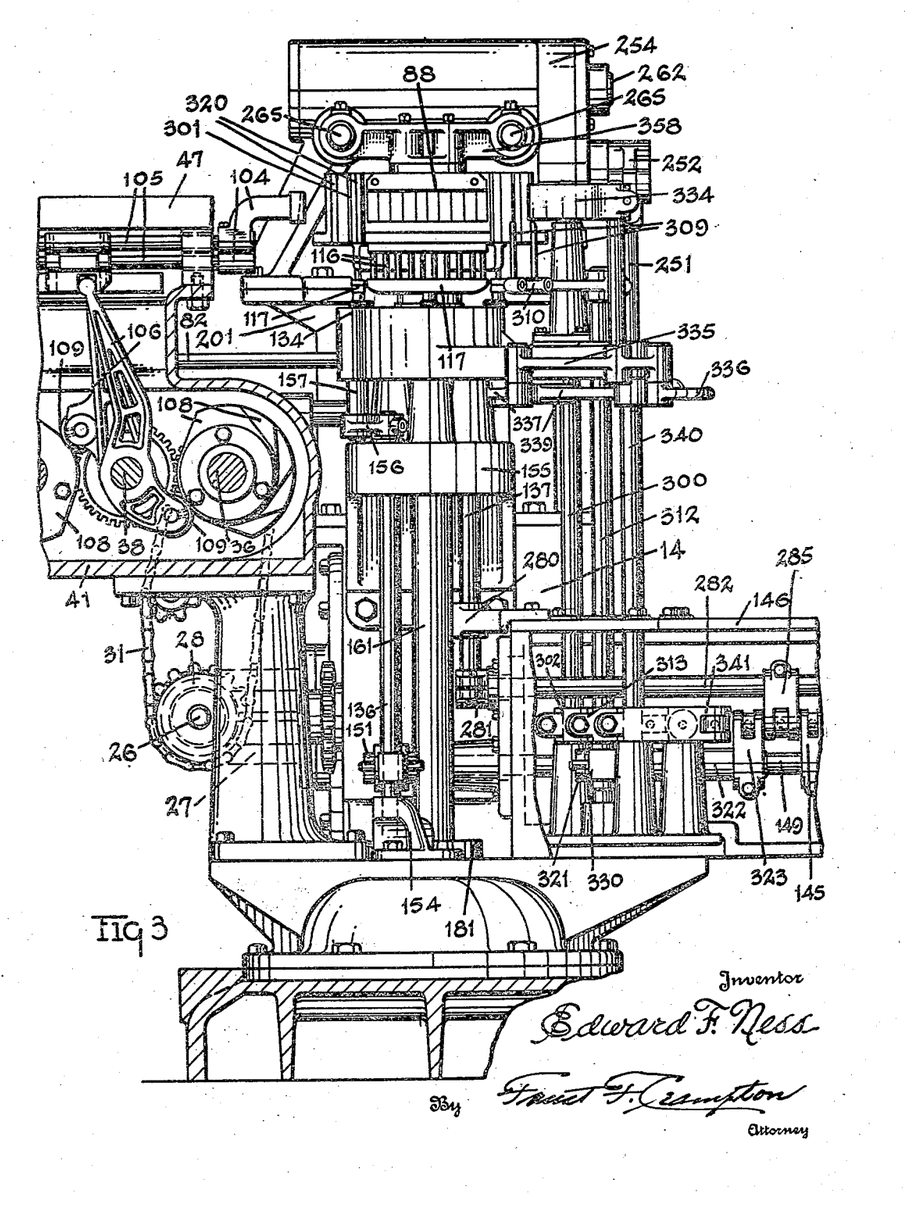
Fig. 3 is a view of sections taken on the planes of the broken line 3—3 indicated in Fig. 1.

The movement of the head 88 is limited to a 90° step-by-step movement by means of an indexing element connected to the lower end of the shaft 161 to which the head is connected. (Fig. 3.)

Figures 21, 22, 23:
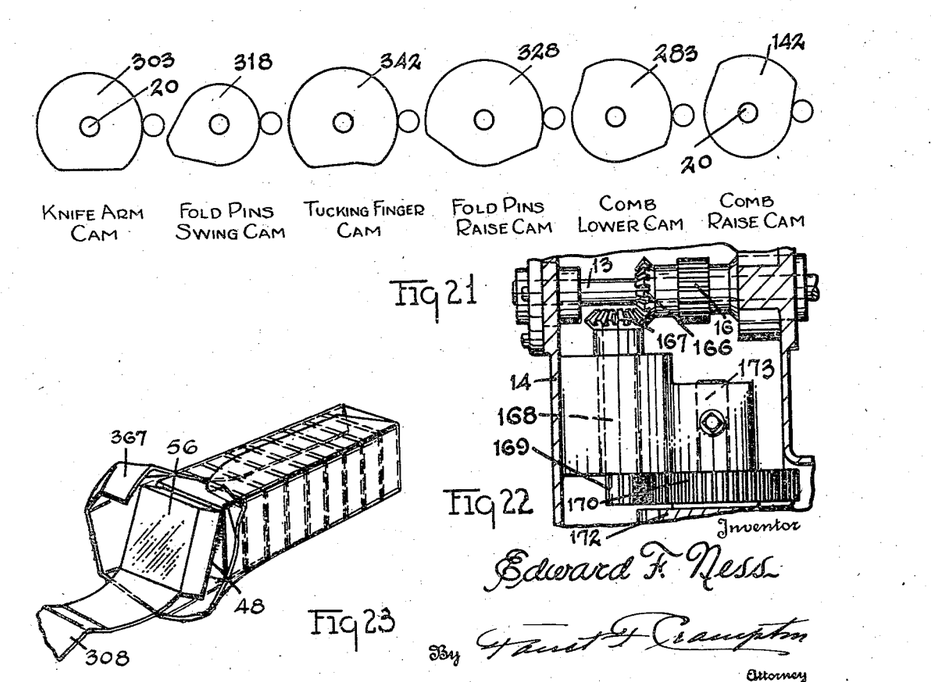
Fig. 21 illustrates relative positions of the cams that manipulate the strip subsequent to the deposition of the articles in chamber formed positions of the strip.
Fig. 22 illustrates a section of a part of the machine and shows interrelated gear wheels used in the machine.
Fig. 23 is a perspective view of a package having articles or sub-divided portions enwrapped by parts of the strip, one end of the package being shown open.

The shaft 161 is driven by the shaft 13 (Figs. 5, 18, and 22). A beveled gear wheel 166 is mounted on the shaft 13 and meshes with the beveled gear wheel 167 located on the shaft 168 that is journaled in a boss formed on the frame 14. One end of the shaft 168 is provided with a small gear wheel 169 which meshes with a gear wheel 170. The gear wheel 170 is connected to the hub 171 of an intermittent driving member 172.

The intermittent driving member 172 is rotatably supported on a shaft 173 which is secured in a part of the frame 14. The intermittent driving member 172 is provided with a roller 176 which engages in the radially extending slots 177 formed in the rotatable indexing member 178 upon each rotation of the intermittent driving member 172. The indexing member 178 is keyed to the shaft 161. Consequently, during a portion of each rotation of the intermittent driving member 172, the head 88 will be rotated 90° and locate the head in position for the reception of another part of the paper strip and at the same time locate the previously shaped paper strip in position for the receipt of the articles.

Where the articles as finally enpacked are of a semi-plastic character, such as oleaginous material, the sets of partitioning plates constitute a sub-dividing means that divides the portions of the material according to the size of the chambers. Thus, butter or oleomargarine may be subdivided to form pats 56 for individual table uses and in order to serve the individual pats, portions of the strip that substantially enclose a desired number of pats of the butter may be conveniently withdrawn from one end of the package and removed, leaving the other portions substantially in their enpacked relation.

Where such moldable material is to be deposited in the paper chambers, parts of the material are preferably pre-shaped to conform to the height and depth of the chambers and a length substantially the same as the total widths of the chambers of each set. The parts of the material are pressed into succeeding sets of chambers. Thus, blocks of the moldable material may be fed to a point in front of a plunger which operates to force the blocks of moldable material against the edges of the paper formed chambers which are sustained by the partitioning plates in the chamber head.

Figure 4:
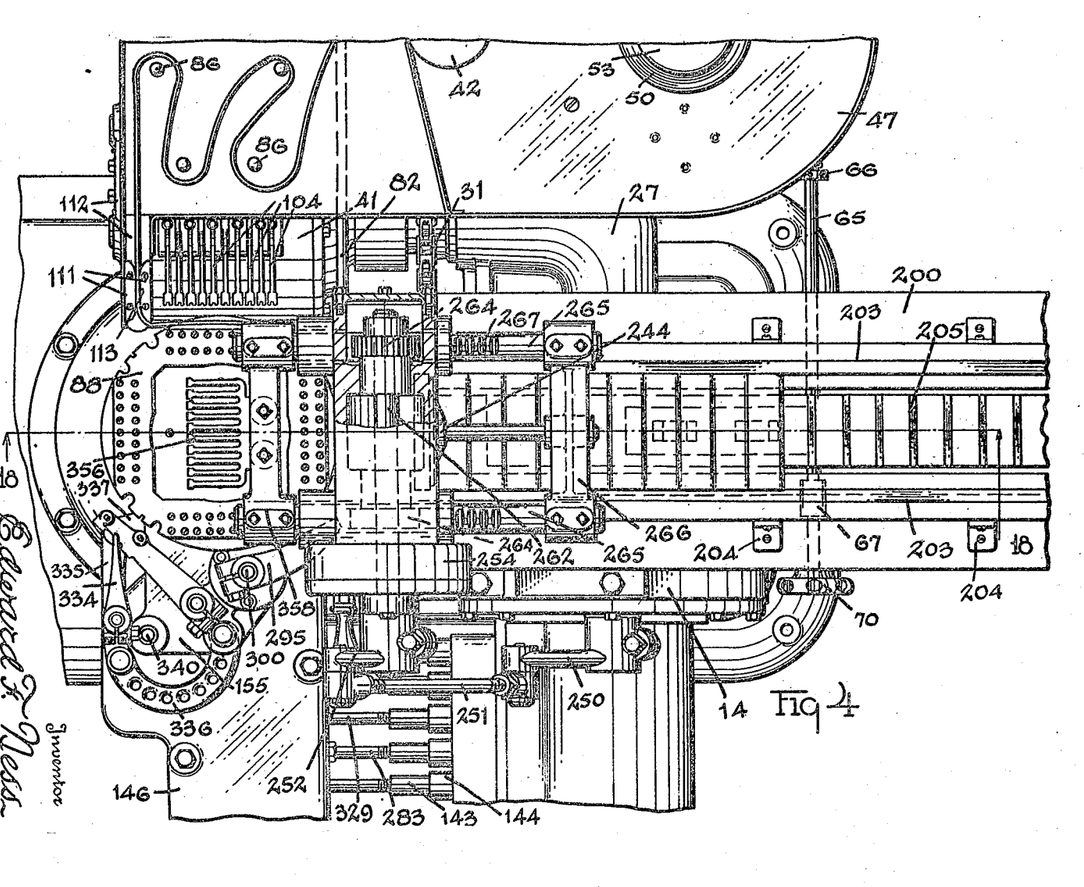
Fig. 4 is an enlarged top view of a part of the machine.

The blocks of moldable material are located on a platform 200. The platform 200 is supported on a pair of side plates 201 which are secured to the frame 14 (Figs. 4 and 18). The platform may be provided with a pair of guide rails 203 for guiding the blocks of the oleaginous material that the machine is particularly designed to enpack. The outer end of the platform 200 is supported by suitable bracket 202 secured to the frame 14 (Fig. 1). The guide rails 203 may be adjustably spaced from each other by means of the brackets 204. The guide rails 203 guide the blocks of the moldable material as they are moved by the conveyor 205 which advances the blocks step-by-step.

In the form of construction shown, the conveyor 205 is caused to produce two reciprocatory movements at right angles to each other. In one movement the blocks are raised, a second movement carries the blocks toward the head 88, a third movement lowers the blocks to the platform and this is followed by a return movement to the initial position, producing thereby a step-by-step movement of the blocks located upon the platform. Each cycle of the movements of the conveyor is such as to move the blocks a step forward substantially the width of the blocks to deliver the blocks from the conveyor and into position for delivery to the head.

The conveyor 205 is supported on a pair of arcuate links 206 which are interconnected by means of a rod 209 (Figs. 1 and 18). One of the links 206 is supported by means of a standard 199. The other link 206 is supported between the side plates 201 and has the arcuate parts 226. The links 206 are reciprocated by means of a lever 208 keyed to the shaft 207 journaled in side plates 201. The shaft 207 is operated by means of a lever 211 (Fig. 11). The lever 211 is operated by means of a face cam 210 formed on the gear wheel 18. A shaft 212 interconnects the lever 211 with a lever 213 and a link 214 that connects the lever 213 with the lever 208. The links 206 are provided with arcuate ends 226 on which the conveyor is supported. The links 206 are supported on the bell crank levers 215 that raise and lower the conveyor. The other reciprocatory movements of the conveyor 205 are produced by the operation of the lever 216 (Fig. 18) controlled by the face cam 210 as modified by the movements of the lever 217, a link 218, and a lever 219 that operates to oscillate a shaft 220. The shaft 220 is journaled in the side plates 201 and has an arm 221 which is provided with a roller 222 that engages a pair of fingers 223 formed in the plate 224 connected to the conveyor 205 and reciprocates the conveyor horizontally. The links 206 are also provided with a roller 225 which engages the fingers 227 that depend from the conveyor supporting plate 224 so that as the arm 221 is oscillated, the arcuate links 206 are reciprocated by movement of the lever 208. Thus, the conveyor will be reciprocated horizontally and vertically so as to pick up the blocks located on the platform 200 and move them forward to deposit each succeeding block in position for elevation.

The blocks of moldable material are deposited upon an elevator 230 which lifts each block from a support on which it is deposited by the conveyor to a point where it is engaged by a plunger. The upward movement of the elevator 230 is effected by the lever 213 that is connected by a link 233 with an arm 234 (Figs. 11 and 18). The arm 234 is pivotally connected to the elevator 230 by the pin 235. The arm 234 is connected to the shaft 236 to which is connected the link 233. In order to maintain the block supporting surface of the elevator 230 substantially horizontal in the movements produced by the lever, an arm 237 is connected to the lower end of the elevator. The arm 237 may be pivotally supported on the side plate 201 and cause the elevator 230 to reciprocate vertically and maintain the supporting surface substantially horizontal.

By reason of the shape of the groove of the face cam 210 that operates to produce one set of movements in the conveyor the elevator 230 will be raised as the conveyor is moved downwardly and rearwardly (Figs. 18 and 19). Thus, as the conveyor 205 rises, the elevator 230 descends for the reception of the succeeding block, and the block previously positioned by the elevator is pressed into the paper chambers by a plunger.

When each block has been positioned by the elevator 230 in position for insertion of the material of which it is formed into the paper formed chambers, it is moved through a passageway 240 (Fig. 19) formed by the bracket 241 and the strips 242. The strips 242 are preferably formed of wood when oleaginous material is being enpacked by the machine. The block is moved from the elevator 230 by a plunger 244 which is actuated by means of a face cam 246 formed on a plate 247 (Figs. 11 and 18). The plate 247 is connected to the gear wheel 18. The cam operates the shaft connected arms 249 and 250. The arm 250 operates an arm 252 that is connected to the arm 250 by the link 251. The arm 252 is supported on a shaft 253 journaled on the wall of a shell 254. The arm 252 has a segmental gear 255. The segmental gear 255 meshes with the segmental gear 261 which is keyed to the shaft 262 that extends through the shell 254. A pair of gear wheels 264 are keyed to the shaft 262. They mesh with rack gears 267 formed on the rods 265 which are interconnected by a yoke 266. The plunger 244 is connected to the yoke 266 and upon movement of the rods 265 through the shell 254, the plunger is carried towards the block disposed on the elevator 230 and in position for forcing the material of the block into the head. The block is moved through the passageway 240 and forced into the paper formed chambers whereby it is sub-divided, each chamber receiving its portion. During this operation, the comb 117 that holds the paper in position may be withdrawn, the movement of the articles or material in the chambers operating to maintain the portions of the paper strip in the form in which they were shaped by the operation of the fingers 104.

In the form of construction shown, the combs 117 are withdrawn, when the moldable or semi-plastic material engages the paper sufficiently to prevent drawing of the paper from one chamber of the head into adjoining chambers.

The combs 117 are withdrawn from the chambers by a hooked member 270 which engages the ends of the combs. (Figs. 3, 5, and 18.) The hooked member 270 is connected to the shaft 272 which is secured in an arm 273. The arm 273 is oscillated by means of the rod 137. (Fig. 5.)

One end of the rod 137 extends through a bearing member 280 (Fig. 3) and is connected to the lever 281 which is keyed to the shaft 282 journaled in the shell 146. The lever 281 is rotated by the peripheral cam 283 located adjacent to the cam 141 which is connected to the shaft 20. The cam 283 actuates a slidable member 284 which is connected to an arm 285 secured to the shaft 282. The contour of the peripheral cam 283 controls the dwell and the length of withdrawal movement of the rod 137, which withdraws the combs in succession.

Upon the completion of the movement of the plunger 244 to complete the deposition of the material within the head, the face cam 246 reverses the movement of the levers 250, 251, and 252 (Figs. 1, 18, and 19) causing the reverse rotation of the segmental gears 255 and 261, and the rotation of the shaft 262 and movement of the gears 264 to cause the rods 265 to produce return movement of the plunger 244 to its block receiving position.

When the head 88 reaches the third position in its intermittent movement, the paper strip that has trailed in the movement of the head is severed. This necessarily occurs prior to the ejectment of the articles from the receiving head. The paper strip is severed intermediate the chamber in which the articles or sub-divided portions of the moldable material has been inserted and the chambers receiving the articles or the blocks of the material.

A knife 298 located on an arm 295 (Fig. 16) is operated to sever the paper into the parts 48. One end of the arm 295 is provided with a plurality of openings in which are located a plurality of pins 296. The pins 296 are secured in small plates 297 located on either side of the knife blade 298. A plurality of springs 299 are located on the bolts 296 between the plates 297 and the end of the arm 295. The small plates 297 act as presser feet on opposite sides of the knife during the severance of the paper. They operate to press the paper against the head. The arm 295 is connected to a shaft 300 which is journaled in a depending part of the bracket 155. A lever 302 is connected to the lower end of the shaft 300. (Fig. 5.) The lever 302 is operated by a cam 303 located on the shaft 20. The lever 302 is actuated by the slidable member 304 which is reciprocally supported and guided by the bearing block 144. The member 304 is pivotally connected to the arm 302 to operate the knife blade for severance of the strip of paper between the presser plates. The head is provided with grooves 301 (Fig. 16) located so that upon each movement of the head they will be disposed in succession in line with the severing movement of the knife and enable the knife to readily cut the paper.

Figures 16, 17:
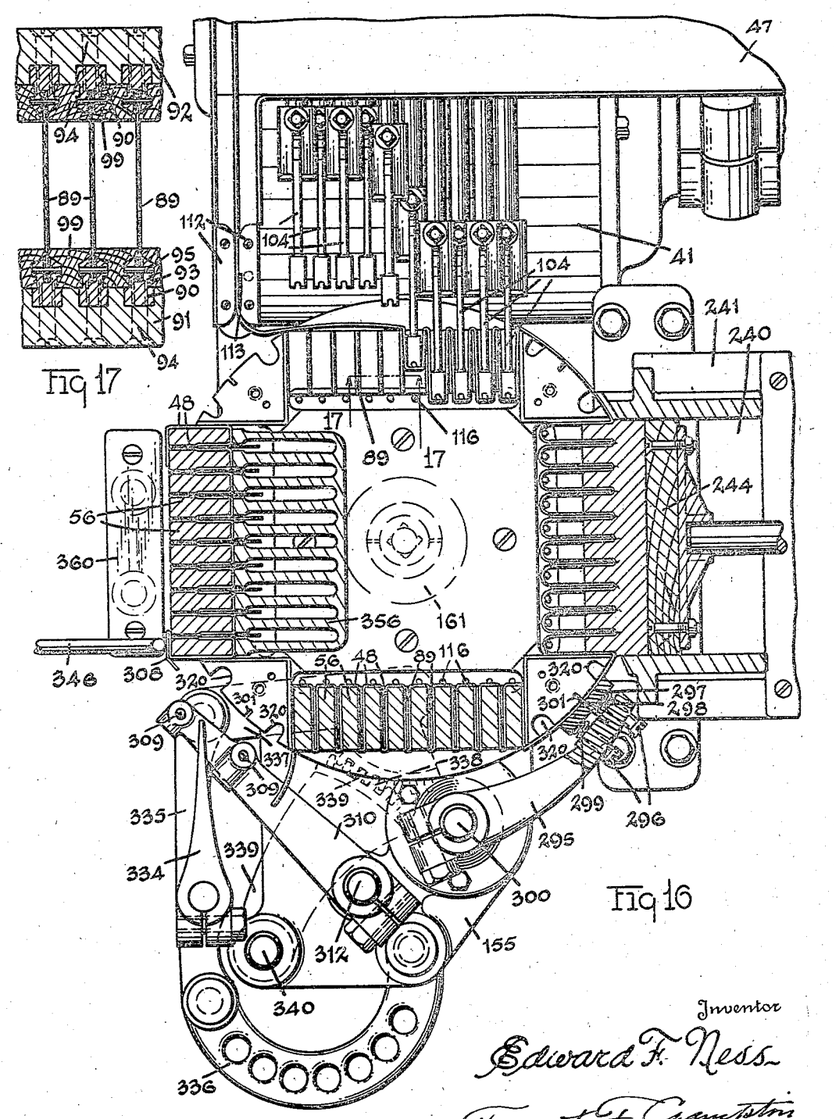
Fig. 16 is an enlarged view of the article receiving head.
Fig. 17 is an enlarged view of a section taken on the plane of the line 17—17 indicated in Fig. 16, and illustrates partitioning walls forming paper shaping chambers.

The head 88 is then rotated another step by the operation of the indexing member which locates the set of chambers containing the articles or the shaped material in position such that the paper and the articles or material may be ejected from the head 88 in their assembled relation. As the head is turned to the position of ejectment of the articles or the sub-divided parts of the material, one end of the strip of paper is engaged by a pair of pins 309 secured in an arm 310. (Figs. 4, 12, and 16.) The strip may be folded or bent in a position that will be conveniently located with reference to subsequent wrappings such that the said portion will form a withdrawal tab 308 for convenient removal of the articles or sub-divided portions of the material deposited in the chambers formed by the paper. The arm 310 is supported on a shaft 312 and describes a circuitous movement by the operation of a pair of cams which produce an oscillatory movement of the arm toward and away from the receiving head 88 and at the same time a vertical movement, the end of the arm being raised and lowered during its outward movement. This enables the pins 309 to be raised against each succeeding part of the strip, formed by the severing action of the knife 298.

The shaft 312 is journaled in the bracket 155 and a lever 313 is connected to the lower end of the shaft 312. (Figs. 5, 12, and 16.) The lever 313 is provided with a curved surface against which a pin 316 is pressed. A slide 317 is connected to the pin 316 and is located in the block 144. The slide 317 is actuated by the cam 318 located on the shaft 20. The cam operates to slide the member 317, causing the arm 313 to oscillate the arm 310 and press the pins 309 into the grooves 320 formed in the receiving head 88 as the arm 310 approaches the grooves 320. The arm 310 is raised by means of a lever 321 which is mounted on a sleeve 322. The sleeve 322 is rotatably supported on the shaft 149 and is caused to oscillate by the arm 323 which is actuated through the slide member 329 by a cam 328 located on the shaft 20. The lever 321 is pivotally connected to the shaft 312 by a suitable fitting 330 and is thus operated by the cam 328 to raise the arm 310. As the cam 328 raises the lever 313, the shaft 312 will cause the end of the arm 310 to be raised and as the arm is again moved outwardly from the head 88, the pins 309 will engage the paper strip and swing the tab end 308 of the strip outwardly from the head 88. While the paper is thus disposed between the pins 309 and the head 88, a tucking finger 334 is moved into the bend of the paper thus produced and moves the paper over and against the articles or subdivided portions of the material.

The finger 334 is supported on a bar 335. The bar 335 is pivotally supported by the links 336 and 337. (Figs. 4, 12, and 16.) The link 337 is connected to a part of the segmental gear 338. The segmental gear 338 meshes with the segmental gear 339 which is connected to a shaft 340 and operates the bar 335 by means of the link 337 connected to the gear 338 and the bar 335. The shaft 340 is journaled in a portion of the frame 14. An arm 341 is connected to one end of the shaft 340 and is actuated by means of a cam 342 located on the shaft 20. (Figs. 5 and 12.) The arm 341 has connected thereto a member 343 that is actuated by the cam 342.

When the tucking finger 334 is withdrawn from the paper, a holding finger 346 bears against the folded end or tab 308 of the paper strip and forms a reverse-bend in the end of the paper strip. (Figs. 1 and 16.) The holding finger 346 is actuated by a lever 348 that is actuated by a cam 349 located on a shaft 350. The surface of the cam is formed to cause movement of the holding finger 346 according to the extent of the movement of the assembled parts of the material as they are ejected from the receiving head 88 and placed upon a suitable receiving surface. The holding finger 346 thus holds the tab 308 as the tab moves with the assembled articles when they are ejected from the head and moved.

The ejectment of the articles from the head 88 is produced by an ejector 356 which has as many projecting parts as there are chambers in which the articles are located. (Figs. 4, 16, and 18.) The ends of the rods 265 are connected by the yokes 266 and 358. The ejector 356 is connected to the yoke 358 and the plunger 244 is connected to the yoke 266. Movement of the rods 265 therefore produces a double operation. The articles are inserted or the moldable material is pressed into the head 88, and, at the same time, the articles or pats of butter at the other side of the head are ejected from the head.

The paper enclosed articles are then moved from the head to a point where they may be further wrapped. They may be received on the elevator 360. (Fig. 18.) The elevator 360 is raised and lowered by means of the rods 361 that are actuated by a bracket 362 carried by a lever 363. (Fig. 1.) The lever 363 is operated by an eccentric 364 located on the shaft 350 to produce vertical reciprocation of the elevator 360.

The package may then be enclosed in a suitable wrapper 367 (Fig. 23) to enclose the articles or pats 56 of butter in their assembled relation with the part 48 of the strip, the tab 308 being conveniently located with respect to the end enclosing portions of the wrapper to enable seizure of the tab and removal of the pats in succession and in number as may be desired, leaving the remainder wrapped and substantially in their original position in the wrapper.

I claim:

1. In a packaging machine, a movable member having a plurality of sets of chambers, means for disposing contiguous integral portions of a flexible strip in the chambers of one set, means for inserting material into the portions of the strip located in the chambers to sub-divide the material, and means for ejecting the material enfolded within the strip from previously charged chambers of another set.

2. In a packaging machine, a movable member having a plurality of sets of chambers, means for imparting a step-by-step movement to the said member, means for disposing a flexible strip along the edges of the sets of chambers in succession, a plurality of fingers for inserting portions of the flexible strip into the chambers of each set, and means for operating the fingers.

3. In a packaging machine, a movable member having a plurality of sets of chambers, means for disposing a flexible strip across the edges of the sets of chambers in succession, means for inserting portions of the flexible strip into the chambers, and a second movable member having means for inserting articles within the portions of the flexible strip and a means for ejecting the flexible strip together with the plurality of articles from the sets of the chambers enfolded within the said strip and means for actuating the said second movable member.

4. In a packaging machine, a movable member having a plurality of sets of chambers, means for disposing a strip of flexible material along the edges of the chambers in succession, a plurality of fingers for progressively inserting portions of the flexible strip into the chambers of each set, and means for inserting articles within the chamber formed parts of the flexible strip.

5. In a packaging machine, a member having a plurality of sets of chambers, means for disposing a flexible strip along the edges of the sets of the chambers and a plurality of fingers insertable into the chambers of each set for inserting portions of the flexible strip into the chambers and retaining the strip in the said chambers until a portion of the strip has been inserted in the last of the chambers of each set, and means for inserting the fingers in succession and withdrawing the fingers coincidently, a strip engaging member associated with each set of the chambers and means for operating the engaging members in succession for retaining portions of the strip in each chamber.

6. In a packaging machine, a movable member having a plurality of sets of chambers, means for disposing a flexible strip along the edges of the sets of the chambers in succession, a plurality of fingers insertable in the chambers for inserting portions of the flexible strip into the chambers and retaining the strip in the said chambers until paper has been inserted in the last of the chambers of each set, means for inserting the fingers in succession and for withdrawing the fingers coincidently, a strip retaining element associated with each set of the chambers, means for operating the elements in succession for securing the strip in the chambers, means for inserting articles within the chamber formed strip and ejecting the flexible strip together with the articles from succeeding sets of chambers.

7. In a packaging machine, a movable member having a plurality of sets of chambers, means for imparting a step-by-step movement to the said member, means for disposing a flexible strip along the edges of the sets of chambers in succession and a plurality of fingers for inserting portions of the flexible strip into the chambers of each set in succession, and means for withdrawing the said fingers and means for inserting articles in the chamber formed portions of the strips.

8. In a packaging machine, a movable member having a plurality of sets of chambers, means for imparting a step-by-step movement to the said member, means for disposing a strip of flexible material along the edges of the sets of chambers in succession, a plurality of fingers for inserting portions of the flexible strip into the chambers of each set in succession, and means for operating the fingers, means for inserting articles in the chamber formed portions of the strip and ejecting the parts of the strip and the articles located in the previously article-charged set of chambers.

9. In a packaging machine, a movable member having a plurality of sets of chambers, means for imparting a step-by-step movement of the said member, means for disposing a flexible strip along the edges of the sets of chambers in succession, a plurality of fingers for inserting portions of the flexible strip into the chambers of each set, and means for operating the fingers in succession to produce a dwell in the movement of each of the fingers after insertion of the portions of the strip until all of the said portions have been inserted in the said chamber of each set and for withdrawing said fingers.

10. In a packaging machine, a movable member having a plurality of sets of chambers, means for disposing flexible strip along the edges of the sets of chambers in succession, a plurality of fingers for progressively inserting portions of the flexible strip into the chambers and retaining the strip in the said chambers until a portion of the strip has been inserted in the last of the chambers of each set, means for withdrawing the fingers and means for engaging the portions of the strip in advance of withdrawal of the fingers, a plunger, means for feeding portions of moldable material to the plunger, means for operating the plunger to force the moldable material within the chamber-formed portions of the strip, a second plunger for ejecting the flexible strip together with the chamber-shaped portions of the moldable material from the sets of chambers in succession, means for operating each of the plungers.

11. In a packaging machine, a movable member having a plurality of sets of chambers, means for imparting a step-by-step movement to the said member, means for disposing a flexible strip along edges of the sets of the chambers in succession, a plurality of fingers for inserting portions of the flexible strip into the chambers of each set, means for engaging the portions of the strip when inserted, means for operating the fingers in succession and withdrawing the fingers, means for moistening the said strip and means for forcing a moldable material into the strip formed chambers and along the moistened surface of the portions of the strip.

12. In a packaging machine, a movable member having a plurality of sets of chambers, means for imparting a step-by-step movement to the said member, means for disposing a flexible strip along the edges of the sets of chambers in succession, and a plurality of fingers for inserting portions of the flexible strip into the chambers of each set and means for operating the fingers in succession, a presser element for engaging the strip intermediate the chamber formed portions of the strip, a knife for severing the said strip in proximity to the presser element, a means for operating the knife and the presser elements.

13. In a packaging machine, a rotatable head having a plurality of sets of chambers, means for rotating the head, means for disposing a flexible strip across edges of the sets of chambers in succession, a plurality of fingers for inserting portions of the flexible strip into the chambers, and means for operating the fingers in succession.

14. In a packaging machine, a rotatable head having a plurality of sets of chambers, means for rotating the head, means for disposing a flexible strip across edges of the sets of chambers in succession, a plurality of fingers for inserting the portions of the flexible strip into the chambers, means for operating the fingers in succession, and withdrawing the fingers simultaneously.

15. In a packaging machine, a rotatable head having a plurality of sets of chambers, means for rotating the head, means for disposing a flexible strip across the edges of the chambers in succession, a plurality of fingers for progressively inserting portions of the flexible strip into the chambers, means for securing the said portions of the strip in position in the chambers.

16. In a packaging machine, a rotatable head having a plurality of sets of chambers, means for rotating the head, means for disposing a flexible strip across the edges of the chambers in succession, a plurality of fingers for progressively inserting portions of the flexible strip into the chambers, a comb associated with each set of the chambers, means for moving the combs to dispose the teeth thereof in engaging relation with the portions of the strip for securing the said portions in the chambers.

17. In a packaging machine, a rotatable head having a plurality of sets of chambers, means for rotating the head, means for disposing a flexible strip of material along edges of the sets of the chambers in succession, a plurality of fingers for inserting portions of the flexible strip into the chambers, means for operating the fingers in succession, means for inserting articles within the flexible strip and for ejecting the flexible strip together with the articles into and from sets of chambers on opposite sides of the head, means for severing portions of the strips at points intermediate the last named sets of chambers.

18. In a packaging machine, a rotatable head having a plurality of sets of chambers, means for rotating the head, means for disposing a flexible strip of material along edges of the sets of the chambers, in succession, a plurality of fingers for inserting portions of the flexible strip into the chambers, means for operating the fingers in succession, means for inserting articles within the flexible strip and for ejecting the flexible strip together with the articles into and from sets of chambers on opposite sides of the head, means for severing portions of the strips at points intermediate the last named sets of chambers, means for bending ends of the severed parts of the strip to form article withdrawing tabs.

19. In a packaging machine, a rotatable head having a plurality of sets of chambers, means for rotating the head step-by-step, means for disposing a flexible strip along the edges of the sets of the chambers in succession, and a plurality of fingers for inserting portions of the flexible strip into the chambers and retaining the strip in the said chambers until paper has been inserted in the last of the chambers of each set, and means for operating the fingers in succession and withdrawing the fingers coincidently, a comb associated with each set of the chambers, and means for moving the combs to dispose the teeth thereof in engaging relation with the strip for securing the strip in the chambers of its associated set, means for inserting articles within the chamber formed parts of the strip.

20. In a packaging machine, a rotatable head having a plurality of sets of chambers, means for rotating the head step-by-step, means for disposing a flexible strip along the edges of the sets of chambers in succession, a plurality of fingers for progressively inserting portions of the flexible strip into the chambers and retaining the strip in the said chambers until the paper has been inserted in the last of the chambers of each set, means for withdrawing the fingers, a plunger, means for feeding portions of a moldable material to the plunger, means for operating the plunger to force the moldable material within the chamber formed portions of the strip, and means for engaging the portions of the strip and disengaging the strip in advance of the completion of the filling of the chambers.

21. In a packaging machine, a rotatable head having a plurality of sets of chambers, means for imparting a step-by-step rotative movement to the said head, means for disposing contiguous portions of a flexible strip in the chambers in succession, a conveyor for conveying parts of moldable material to the said head, a support for supporting the parts of the moldable material, an elevator for raising the said parts to the sets of chambers in succession, a plunger for forcing the said shaped moldable parts into the chamber formed portions of the strip to subdivide the said moldable material and means for producing a reciprocatory movement of the elevator towards and away from the said head and to raise and lower the parts of the moldable material from and to the support to produce step-by-step movements of the parts towards the head and for operating the elevator to raise the moldable shaped parts in succession to the chambers and to operate the plunger to force the material into the strip formed chambers.

22. In a packaging machine, a movable member having a plurality of sets of chambers, means for inserting portions of a flexible strip into the chambers of each set, means for forcing moldable material into the chambers simultaneously to sub-divide and shape parts of the material in conformance with the walls of the chambers and within the portions of the strip of one set and means for ejecting shaped parts of the material enfolded in a strip from a previously charged set of chambers.

23. In a packaging machine, a movable member having a plurality of sets of chambers, means for inserting portions of a flexible strip into the chambers of each set, means for surface lubricating the strip, means for forcing moldable material into the chambers simultaneously to sub-divide and shape parts of the material in conformance with the walls of the chambers and within the portions of the strip of one set and means for ejecting the shaped parts of the material enfolded in the strip from a previously charged set of chambers.

24. In a packaging machine, a movable member having a plurality of chambers, means for disposing contiguous portions of a flexible strip in the chambers, means for moving a quantity of material into a plurality of said chambers and within the said portions of the strip simultaneously to subdivide the material and enfold portions of the said quantity of material, and means for ejecting the enfolded sub-divided portion of the material simultaneously.

25. In a packaging machine, a movable member having a plurality of sets of chambers, means for disposing parts of a flexible strip along the edges of the sets of chambers in succession, a plurality of members for inserting portions of a part of the flexible strip sequentially into the chambers of each set and holding the portions of the strip, and means for operating the members sequentially.

26. In a packaging machine, a member having a plurality of sets of chambers, means for disposing a flexible strip across the edges of the sets of chambers in succession, means for inserting portions of the flexible strip sequentially into the chambers of each set in succession, means for inserting a quantity of material and sub-dividing the material as it is inserted into the chambers and within the portions of the flexible strip in the chambers of one set and simultaneously ejecting a flexible strip, together with the sub-divided strip enfolded part of the material from another of the sets of chambers.

27. In a packaging machine, a movable member having a plurality of chambers, means for disposing a flexible strip across the edges of the chambers in succession, means for inserting portions of the strip sequentially into the chambers, means operated by the machine for inserting articles into the said portions of the flexible strip and into the chambers, and means for ejecting a plurality of the articles enfolded within the strip simultaneously from a plurality of the said chambers.

EDWARD F. NESS.